United States Patent Office 3,331,699
Patented July 18, 1967

3,331,699
NACREOUS GLASS FLAKE PIGMENT
COMPOSITIONS
William J. Marshall and Howard R. Linton, Scotch Plains, N.J., and Martin E. Cupery, Wilmington, Del., assignors to E. I. du Pont de Nemours and Company, Wilmington, Del., a corporation of Delaware
No Drawing. Filed Oct. 24, 1963, Ser. No. 318,495
13 Claims. (Cl. 106—291)

This invention relates to new lustrous flake pigments, and more particularly, to new coated glass flake pigments exhibiting interference colors of great brilliance accompanied by a lustrous sparkle and to a process for producing the same.

The color of ordinary colored pigments of commerce depends upon the selective absorption of some of the wave lengths of the incident light by the molecules of the substance. Such colors are functions of the electronic configuration of the molecule; they are inherent in the nature of the substance, and are essentially invariant in hue under a given source of illumination, regardless of the angle of viewing. They serve many valuable purposes as pigments, dyes and the like.

Although many of the colors in nature are caused by inherently colored substances, it has long been known that many other colors in nature, some of them extremely brilliant, are purely physical optical phenomena or interference colors and many attempts have been made to utilize the optical phenomena of interference colors in articles of commerce. The iridescence of natural pearl and related objects is well known and widely used for jewelry and decorative purposes. One of the best known examples of interference colors in nature is found in natural pearl in the lining of many seashells. Efforts have been made, with some success, to obtain artificial materials which can be dispersed in resins and plastics to simulate the effect of pearl. An extract of fish scales, essentially the compound guanine, has been obtained in flake-like crystals and marketed as a natural pearl essence. However, the utilization of this compound in objects to produce a decorative effect has certain inherent disadvantages. For example, the compound has a very limited range of iridescent colors and no color is predominant. In addition, it must be retained in paste form and cannot be allowed to dry out prior to incorporation in a vehicle. It also has poor lightfastness so that articles utilizing this compound lose their decorative effect on long exposure to sunlight; furthermore, it is very expensive.

Numerous inorganic materials which crystallize in thin flake form have been proposed for use as nacreous or iridescent pigments. Certain basic lead carbonate and lead acid phosphate derivatives have achieved some recognition as nacreous pigments when produced in the form of thin flake-like crystals. However, they suffer from deficiencies similar to those of natural pearl essence; for example, the limited range of colors, poor lightfastness and the fact that they must be kept in paste form prior to incorporation in a vehicle. In addition, the presence of lead in the compounds is objectionable because its toxicity greatly limits the use of these articles.

All pigments exhibiting nacreous effects when dispersed in a vehicle have certain common optical characteristics which set them apart from the usual colored pigments and white pigments of commerce. Titanium dioxide, for example, is ordinarily included in coating compositions to achieve maximum random scattering of light. This is realized by controlling the size of particles in the pigment at about 0.25 micron. The particles refract light as if they aproximated spheres of about 0.25 micron diameter, although particle shape may not be round but may assume a variety of irregular forms. A coating composition containing such pigment units is normally a great many times thicker than 0.25 micron so that a beam of light entering the finish encounters a large number of particles. The light beam, in its passage, is bent or refracted each time it enters and again when it leaves an individual particle. Such bending or refraction of light is in a completely random manner and a sufficient number of pigment units are encountered in a normal finish to prevent substantially the passage of the light beam through the finish. Instead, the light beam is bent back on itself and is, in effect, reflected from the finish. It has been the object of prior art efforts in preparation of titanium dioxide pigments to maximize this type of light reflection capability.

In some instances, titanium dioxide is prepared as a composite pigment blended or partially coalesced with calcium or barium sulfates. In these compositions some of the titanium dioxide is often attached to the calcium or barium sulfate extenders but the titanium dioxide particles are of such size and random shape so as to scatter light. The effect in prior art pigments is to maximize light reflection by random scattering mechanisms.

In contrast, the optical units of nacreous pigments to which this invention is directed, are extremely thin flakes that tend to minimize scattering of light thereby obtaining direct reflectance of sparkle.

This invention provides a novel group of nacreous flake pigments which can be marketed in a dry, easily dispersible form, which have excellent lightfastness, are generally non-toxic in character and relatively low in cost. These flake pigments can be formulated to produce products exhibiting an exceptionally high degree of lustrous sparkle as well as brilliant colors.

An object of this invention, therefore, is to provide new nacreous pigments of improved sparkle, and having more intense interference colors than have been known heretofore. A further object of this invention is to provide new nacreous pigments that have excellent lightfastness, are generaly non-toxic in character and relatively low in cost. Another object of this invention is to provide new nacreous pigments that can be easily incorporated into plastics, paints and the like to produce a lustrous sparkle. Another object of this invention is to provide a novel process for preparing nacreous pigments. Other objects and advantages of the invention will be apparent from the ensuing description.

It has now been found that glass flakes may be coated with a translucent layer of particles of a metal oxide having a high index of refraction, such as zirconium dioxide, chromium oxide and the like, especially titanium dioxide or hydrated titanium dioxide provided there is first deposited on the glass flakes a nucleating surface comprising a very finely divided metal oxide compound which is insoluble in the acidic solution from which the said translucent layer of metal oxide is to be deposited. The resulting products are nacreous flake pigments which exhibit a high degree of lustrous sparkle as well as brilliant colors which vary with the thickness of the translucent layer of the metal oxide.

The new nacreous flake pigments of the present invention comprise three components—(1) a glass flake substrate, (2) an acid insoluble metal oxide compound deposit on the glass flakes which forms a nucleating surface thereon that is receptive to the deposition of a layer of translucent metal oxide particles, and (3) a thin, translucent layer of metal oxide of selected small particle size deposited on the acid insoluble metal oxide surface.

The invention can best be understood by describing a preferred embodiment utilizing a tin oxide compound as the acid insoluble metal oxide that forms a nucleating surface on the glass flakes for reception of the translucent metal oxide, titanium dioxide.

Glass flakes of a suitable dimension, in the order of 1.0 to 5.0 microns in thickness, and varying in the size of the major dimension from about 10 microns to about 400 microns, with at least 50 percent below 75 microns and about 85 percent below 150 microns, is added to water to form a thin slurry. Crystalline stannous chloride is added to the slurry and it dissolves, and then hydrolyzes to form a colloidal suspension of a hydrated tin oxide compound, which deposits on the glass flakes. The deposition of the tin oxide compound on the glass flakes may be accelerated by heating the slurry, which also accelerates insolubilizing the tin oxide compound on the flakes. Alternatively, the free colloidal suspension of tin oxide compound that is not deposited on the glass flakes may be separated by decantation or filtration and the deposit of tin oxide on the glass flakes can be insolubilized by drying.

In any case, the treated glass flakes are then suspended in water to which is added a strongly acid solution of titanyl sulfate. The mixture is heated, causing titanyl sulfate to hydrolyze to hydrous titanium dioxide that immediately and selectively deposits on the treated glass flakes. The amount of hydrous titanium dioxide which is deposited on the flakes can be built up in proportion to the amount of titanyl sulfate liquor which is added to the hydrolyzing slurry, as well as in proportion to the time of heating. As this process proceeds, it is possible to follow the increasing thickness of the outer translucent layer of hydrous titanium dioxide by observing the change in the interference colors from an initial silver appearance to gold, and progressively to red, violet, blue and green. By the proper selection of the amount of titanyl sulfate used, any desired interference color can be readily achieved.

The optical principles which explain interference colors are well known and are discussed in many textbooks of physical optics such as Robert W. Wood's "Physical Optics," third edition, New York, 1936, page 198. Briefly stated, interference is an optical phenomenon associated with the reflectance of light from the surfaces of thin films, wherein there is a reduction in the intensity of a certain wave lengths of the incident light (restructive interference) and reinforcement of other wave lengths (constructive interference). The extent to which particular wave lengths are affected is dependent upon the thickness of the film and its refractive index. When the thickness is such that a ray reflected from one surface of a film is out of phase with a ray which has passed through the film and been reflected from the other surface, there is destructive interference.

Since there is a phase reversal when light is reflected from the surface of a medium of higher refractive index, the condition of maximum destructive interference (minimum reflectance) is satisfied when the effective optical path (twice the thickness multiplied by refractive index) in a film of high refractive index is one wave length or a simple multiple thereof. Considering the refractive index, N, of the film, the thickness ($t$) thereof for destructive interference with any wave length $\lambda$ is given by the formula:

$$t = \frac{n\lambda}{2N}$$

where $n$ is a small whole number usually not greater than 5.

By the same line of reasoning, if the two rays emerge in phase, there is reinforcement or a maximum of reflectance. This condition is satisfied, again assuming phase reversal, when the effective optical path is one-half a wave length or an odd multiple thereof, the formula for the thickness at maximum reflectance being $$t = (n+\tfrac{1}{2})\frac{\lambda}{2N}$$

where $n$ is 0 or a small whole number usually not greater than about 5.

When $n$ is greater than 1, it is common to speak of the interference as a higher order, second order, third order, and the like.

From the above, it can be seen that the nacreous pigment compositions of the invention are prepared by slurrying glass flakes in an aqueous medium with a colloidal suspension of a suitable metal oxide compound, whereupon said metal oxide compound is deposited on the glass flakes as a nucleating surface and rendered insoluble in the acidic solution from which the translucent layer of metal oxide will be deposited. The metal oxide on the glass flakes is insolubilized by heating and/or stirring the aqueous medium containing the glass flakes. The treated glass flakes are then receptive to the deposition of an outer layer of a translucent metal oxide having a high refractive index from a salt solution of a metal such as, for example, titanium, zirconium, chromium, iron, nickel, tin or cobalt.

The glass flake substrate used for the purposes of this invention are particles of glass which have two dimensions (length and width) of similar magnitude and characteristically much greater than the third dimension. Ideally, the preferred flakes for the invention should have major dimensions in the order of 30 microns or less with a thickness not greater than about 1.0 micron. Such flakes are not, however, commercially available and the presently available flakes are non-uniform in dimensions with a fraction approaching 25% in the preferred size, with about 50% below 75 microns, about 80% below about 150 microns and some flakes ranging up to about 400 microns. The thickness of commercially available glass flakes is also greater than usually desired, the available range being from 1 to 5 microns. The dimensions of the particles are not critical for the broad aspects of the invention, but the smaller sizes are required for some uses. The desired size can be obtained by a suitable classification of the flakes, such as by classifying through selected screens.

The nature of the glass is not critical. For many purposes, clear, colorless, glass flakes are desired but it is also possible to use specialty glasses which may include glass to which a color has been imparted by the inclusion of selected chemicals in the melt.

The material which forms the thin outer layer on the glass flakes and imparts to them the desired nacreous character and inteference color is a selected translucent metal oxide compound of high refractive index and selected particle size, such as hydrous titanium dioxide. However, as pointed out above, in order for a thin outer layer of a translucent metal oxide compound to be deposited on the glass flakes to produce a nacreous effect, it is necessary that there first be deposited on the glass flakes a very thin nucleating surface of a metal oxide compound which is insoluble in the acidic solution from which the outer translucent layer is deposited. In the absence of such a nucleating surface, hydrolysis of a titanium salt solution, for instance, in the presence of glass flakes results in the formation of free hydrous titanium dioxide mixed with the glass flakes but not adhering thereto.

Such a product exhibits no nacreous effect nor significant interference color. In contrast, in the presence of the nucleating surface, as the titanium salt solution is hydrolyzed, the hydrous titanium dioxide deposits on the glass flakes in the form of particles less than about 0.1 micron in diameter and adheres firmly thereto with substantially no free oxide apparent in the suspension. The product, when isolated, is a translucent nacreous pigment with pronounced interference color. There are only a small number of metal oxide compounds that are insoluble in the acidic solution from which the translucent layer of metal oxide is deposited, and capable of forming a nucleating surface on glass flakes. It is also characteristic that a nucleating surface deposits only from a positively charged colloidal suspension. Tin compounds are especially valuable for this purpose as they readily hydrolyze to form such positively charged colloidal suspensions. Likewise, both titanium salts and zirconium salts can be hydrolyzed to form positively charged colloidal suspensions either separately prepared or suitably prepared in the presence of the glass flakes as will be outlined in specific examples. Another suitable oxide compound is the fibrous boehmite form of alumina monohydrate which consists of fibrils with a surface area of 250 to 350 m.$^2$gm. This material readily disperses in water to form a positively charged colloidal suspension which, when mixed with glass flakes, deposits thereon to form a nucleating surface.

The exact nature of the nucleating surface other than its chemical constitution is not known. Although glass flakes are substantially opaque to an electron beam, there is some evidence (from electron microscopy) to support the proposition that the nucleating surface is generally made up of particles well down in the colloidal range, probably below 50 millimicrons in most cases. It seems apparent that the really important aspect is to cause this nucleating surface to deposit on the glass flakes, rather than to cause self-nucleation of the colloid with the resulting formation of a free metal oxide compound. It is quite possible that, when the translucent metal oxide is chemically the same as the nucleating surface (see Examples 10 and 11 below), there may be no discernible difference between said layer and said surface in the final product. Nevertheless, unless a nucleating surface is first deposited, no translucent layer will be formed on the glass flakes and no nacreous effect nor interference color will be formed.

The amount of the metal oxide compound required to be deposited as a nucleating surface seems to be somewhat critical for optimum results, although the optimum amount to use seems to vary for the different useful agents. The minimum useful amount of metal oxide compounds appears to be at least about 0.2% metal oxide compound based on the weight of the glass flakes. Using tin oxide the preferred amount is in the range of 0.5% to 2% but much larger amounts may be used, say up to 35% or even 50%, by weight, with some sacrifice in quality at the higher level. Using hydrous TiO$_2$ as the nucleating surface, the opimum amount seems to lie in the lower part of the range, say 0.4% to 1%, preferably 0.4% to 0.5% by weight. Optimum amounts of fibrous alumina are also in the lower part of the range, say 1% to 5% by weight.

For most purposes, the preferred and most versatile metal oxide compound to form the nucleating surface is a tin oxide compound. For convenience, it is considered as stannic oxide (SnO$_2$) but its exact nature is not known, hence the designation "tin oxide compound." It is probably first precipitated as a hydrous oxy-salt (oxy-chloride, for instance) and largely converted to the oxide during the insolubilization step. Various tin salts may be used as the source of the tin oxide compound and both stannous and stannic salts are applicable. It is characteristic of many tin salts that the solutions readily hydrolyze on dilution to form highly colloidal suspensions which are positively charged. This pronounced tendency to form colloidal suspensions appears to be the property which makes tin compounds so versatile in the proposed use. Insolubilization of the nucleating surface of tin oxide compound is readily effected by heat, either by drying the isolated flakes or by heating the slurry to relatively high temperatures.

The successful deposit of a nucleating surface of hydrous titanium dioxide or hydrous zirconium dioxide requires special care because the formation of colloidal suspensions of these compounds is not as readily achieved as it is with tin compounds. However, techniques of preparing colloidal suspensions of such hydrous metal oxides are well known. For instance, if a precipitated hydrous titanium dioxide is washed free of soluble salts, and any residual acid finally neutralized, the resulting paste is readily peptized to a colloidal suspension by adding a small amount of hydrochloric acid. A similar technique may be used to prepare a colloidal suspension of hydrous zirconium dioxide except that acetic acid is preferred as the peptizing acid. Exposure of the glass flakes to such a colloid followed by a heat treatment for insolubilization gives an effective nucleating surface. It is also possible to form the colloidal suspension in the presence of the glass flakes, with almost instantaneous deposition of the nucleating surface, by slurrying the flakes in a very dilute solution of titanyl sulfate (in the order of 0.1% concentration based on TiO$_2$ content) followed by slow heating to near the boil. A nucleating surface of hydrous zirconium oxide may also be deposited in a similar fashion. In using fibrous boehmite as described above as the nucleating surface, it is necessary first to disperse it in a colloidal form by vigorous agitation in water after which the glass flakes are slurried in this colloidal suspension, separated from the water, and dried at a temperature of 80° C. or above. This form of alumina, known as fibrous boehmite, is quite unique in its ability to form a positively charged colloidal suspension which can be converted to an acid insoluble form, in comparison to the usual form of alumina-hydrate that has not been converted to the fibrous boehmite form and does not readily become insoluble in dilute acid.

The glass flakes having an acid insoluble metal oxide nucleating surface are now receptive to the deposition of an outer translucent layer of a metal oxide compound having a high refractive index. The translucent compounds of this layer may be colorless or colored and thereby contribute color both by means of light absorption from the inherently colored compound, and by interference colors from the thin transparent layer having a high index of refraction. The preferred translucent metal oxides applicable to this invention are titanium dioxide and zirconium dioxide. However, other representative metal oxides that function in a like manner when used alone include the oxides of iron, chromium, nickel, cobalt, tin and hydrous forms thereof.

Although this invention, in relation to the outer translucent metal oxide layer, will be described particularly in terms of the deposition of the layer of hydrous titanium dioxide particles, the essential feature is the deposition of a layer of a metal oxide compound of high refractive index. Zirconium compounds are also readily hydrolyzed to hydrous oxide which will deposit as a transparent layer on the treated glass flakes. The refractive index of hydrous zirconium dioxide is lower than that of hydrous titanium dioxide, hence the interference colors are less intense but they are within the scope of the invention.

The desired layer of titanium dioxide as the hydrous oxide, is conveniently desposited upon the treated glass substrate by suspending the treated glass substrate in a dilute, strongly acidic solution of titanyl sulfate and then hydrolyzing the titanium sulfate solution by heating to about 90–100° C. and maintaining the solution at that temperature for a period of 1 to 3 hours. The hydrous titanium dioxide, as formed, is continuously deposited on the treated glass flakes with a minimum of formation of free hydrous titanium dioxide.

The titanyl sulfate solution used in the preferred processes may be obtained in any convenient manner. Thus a relatively pure titanyl sulfate may be obtained by dissolving in sulfuric acid a hydrous titanium oxide precipitate commonly obtained as an intermediate in the preparation of $TiO_2$ pigment. However, it has been found that such highly pure solutions are not necessary and that equivalent results can be obtained by using a conventional titanyl sulfate concentrate prepared from the ore and containing a small amount of iron which is maintained in the divalent state by the presence of a small amount of trivalent titanium in the strongly acid solution. Thus the concentration of the titanyl sulfate in the aqueous solution may vary over a range, say, preferably from as little as 2 parts (calculated as $TiO_2$) to about 20 parts per 100 parts of solution. Regardless of the concentration, it is necessary that there be free acid in the solution at all times over and above that necssary to convert all of the titanium oxide to $TiOSO_4$. This is necessary to prevent precipitation of a hydrous titanium oxide at room temperature. The titanium oxide art conventionally uses a "factor of acidity" (F.A.) as a parameter to define this reaction where $$F.A. = \frac{100 \text{ (total acid-combined acid)}}{\text{combined acid } (TiOSO_4)}$$

In the examples below, the titanyl sulfate solution has an F.A. value of about 80 but higher F.A. values would be preferred if more dilute titanyl sulfate were to be used. The necessary condition is that there must be sufficient acid to prevent hydrolysis at room temperature but not sufficient to unnecessarily repress hydrolysis at elevated temperatures. The desired conditions will obviously vary somewhat with concentrations of reactants and with temperature and, within a broad range, the conditions may be readily determined by the skilled chemist. In general, the preferred F.A. values are within the range considered optimum for the preparation of pigment grade $TiO_2$.

Regardless of the source of the titanyl sulfate and regardless of the concentration in the starting material, the concentration of the titanium salt in the solution in which the treated glass flakes are suspended at the point of hydrolysis is more dilute by a factor of at least 2 or 3 than is preferred for $TiO_2$ pigment. For the best results in this invention, this concentration of titanium salt (calculated as $TiO_2$) in the solution at the point of precipitation may be as little as about 1 part and should not exceed about 7 parts per 100 parts of solution.

The amount of titanium salt used in relation to the treated glass flakes may vary over a wide range and is significant only as a control on the thickness of the ultimate oxide coating. In general, the usage calculated as $TiO_2$ may be in the range of about 4 parts per 100 parts of glass flakes up to as much as about 40 parts per 100 parts of glass flakes with a preferred range for $TiO_2$ of about 4 to 20 parts per 100 parts of glass flakes. The usage of the $TiO_2$ is, of course, reflected in the thickness of the layer deposited and the resulting interference color. Although in the examples below there is no direct correlation between the usage and the amount of $TiO_2$ deposited on the glass flakes, the following table sets forth the analysis of a series of samples for $TiO_2$ and it is quite evident there is correlation between the amount of $TiO_2$ actually deposited on the glass flakes and the resulting interference colors.

| Color: | Percent $TiO_2$ |
|---|---|
| Silver flakes | 3.0 |
| Gold flakes | 5.8 |
| Violet flakes | 7.4 |
| Blue flakes | 8.6 |

It has been found that the outer translucent layer may vary in thickness from a range of about 20 millimicrons to about 250 millimicrons in order to produce products that vary in color as the thickness of the layer is increased.

It appears that one of the critical features, in addition to the nucleating layer, that distinguishes the new products of this invention from metal oxide pigments of the prior art lies in the character of the outer translucent layer of the metal oxide deposited on the treated glass flakes. Examination of such flakes in the electron microscope suggests that the hydrous oxide outer film has particles so small as to be very poorly resolved in the electron microscope. They appear to be well under 0.1 micron in size but the particles do not appear to have sharp edges and tend to be irregular in size and shape. Such small particles exhibit substantially the optical character of a film, being essentially transparent in contrast to the tendency of conventional $TiO_2$ pigment particles and other oxide pigments to scatter the light and thus be largely opaque in nature.

It is well known that hydrous titanium dioxide is sensitive to light and the products of this invention, having a coating of translucent titanium dioxide, unless further treated, are no exceptions to this general rule. From the exposure of films containing these pigments to light, such films frequently become more opaque and less lustrous in appearance. However, it is unexpectedly true that dispersions of these flakes in transparent plastics such as the usual vinyl plastics show almost no change at all on exposure to light, so that the pigments are directly useful in certain potentially large uses. For other uses, it is found that there are available methods which will stabilize the products against the influence of light without significantly altering their valuable properties. Methods of this type are set forth in the examples below and include a mild calcination which is possible without destroying the flake character of the glass. The temperature of such a calcination is obviously limited by the melting point of the glass but it has been possible to calcine at a temperature of 700° C. without harm. Lower temperatures of 600° C. and the like show some beneficial effect but are less beneficial than the 700° C. calcination. When the temperature is carried significantly above 700° C., there is a tendency for the glass flakes to soften and for the products to lose a substantial part of their luster.

Another method of stabilizing the flakes against the influence of light is to deposit on the surface thereof a layer of silica. This is conveniently done by the cautious hydrolysis of a solution of sodium silicate by the addition of dilute acid.

Still another method of stabilizing the product is found in the superposition of another layer of a different metal oxide on the surface of the titanium dioxide layer, a very effective and convenient oxide for this purpose being a chromium oxide deposited by the hydrolysis of a chromic sulfate solution. Such an oxide has some color of its own, especially after calcination, and does alter the color of the resulting coated flake pigment, so that the deposition of a small amount of chromium oxide followed by calcination gives a desirable golden hue to the pigment of considerably more intensity than the gold flake pigments obtained directly without the addition of the chromium oxide, at the same time improving the lightfastness markedly. Other metal oxides which can be deposited and thereby improve lightfastness include aluminum oxide, iron oxide, nickel oxide, antimony oxide, and a top layer of tin oxide. Such oxides may be deposited from appropriate solutions of the corresponding salts by methods which will be obvious to the skilled chemist.

The following examples illustrate the invention in more detail. Except as otherwise specified, all specification of parts used refers to parts by weight.

Example 1

250 parts of glass flakes characterized as follows:

Specific surface—less than 1 square meter/gram.
Thickness—2 to 5 microns.

Sieve analysis:

| Sieve | Size in Microns | Wt. Percent |
|---|---|---|
| 40 to 100 mesh | 149–420 microns | 12.9 |
| 100 to 200 mesh | 74–149 microns | 32.5 |
| 200 to 325 mesh | 44–74 microns | 22.0 |
| 325 to 400 mesh | 37–44 microns | 9.6 |
| Through 400 mesh | Less than 37 microns | 23.0 | are slurried in 2500 parts of water at 15° C. While stirring, 25 parts of crystalline $SnCl_2 \cdot 2H_2O$ is added. The slurry is heated rapidly to 77° C. and held at 77° C. for 45 minutes whereby $SnCl_2$ dissolves and is hydrolyzed to form a colloidal suspension of a tin oxide compound. It is filtered hot, washed free of soluble salts and dried at 82° C. The flakes are then slurried in 2500 parts of water to which is added 604 parts of a concentrated titanyl sulfate solution ($TiOSO_4$, calculated as $TiO_2$, 15.5% $FeSO_4$, calculated as Fe, 3.7%; factor of acidity 80). The slurry is then heated to the boil and boiled for 3 hours, samples being taken off at intervals of 15 minutes, filtered, washed and dried. When a small portion of the dried sample is reslurried in water, it is found that it exhibits a lustrous colored sparkle. As the time of heating is increased the color progresses from an initial silver to brilliant gold, to red, violet, blue and green in this order and then to gold of the second order, etc. These same colors can be observed by dilution of a small sample withdrawn from the slurry, whereupon the heating may be stopped at any desired point after which the slurry is filtered, immediately washed free of soluble salts and dried to give a flake pigment of the selected color.

Example 2

250 parts of the glass flakes described in Example 1 are slurried in 2500 parts of cold water to which is added 25 parts stannous chloride crystals ($SnCl_2 \cdot 2H_2O$). The slurry is heated to the boil, boiled 4 hours and then fitlered and washed free of soluble salts. The moist flakes are reslurried in 2500 parts of water to which is then added 604 parts of titanyl sulfate solution (15.5% $TiO_2$; F.A. −80), and the slurry heated to the boil, and boiled for 2 hours. Samples taken at 15 minute intervals during the boiling period show the same progression of colors found in Example 1.

Example 3

250 parts glass flakes (as in Example 1) are slurried in 2500 parts of water to which is then added 15 parts crystalline stannous chloride ($SnCl_2 \cdot 2H_2O$) and the charge is boiled for 2 hours. It is then cooled to 65° C. and 604 parts of titanyl sulfate solution (15.5% $TiO_2$; F.A. −80) is added. The charge is then heated again to the boil and boiled for 2 hours yielding the same range of lustrous interference colors.

Example 4

In an alternative procedure, the glass flakes are slurried in water and the stannous chloride added as in Example 1, but the slurry is not heated. Instead it is stirred at room temperature for 2 hours, filtered and dried without washing. The dry flakes are then reslurried in water to which the titanyl sulfate is added, and treated thereafter as more fully set forth in Example 1. A series of colored glass flakes is obtained as in Example 1, but the colors are generally less intense than the products of Example 1.

Example 5

The process of Example 1 is repeated except for a variation in the amount and the nature of the tin salt used, and the tin treatment is carried out at the boil for 2 hours. The following table shows the variation in usage of tin salts and the results of the various treatments.

| | Tin Salt Used | Parts by Weight | Equivalent $SnO_2$, Percent of Flakes | Results |
|---|---|---|---|---|
| A | $SnF_2$ | 0.25 | 0.1 | No colors, no TiO coating. |
| B | $SnF_2$ | 2.5 | 0.96 | Dull colors. |
| C | $SnF_2$ | 7.5 | 2.88 | Good colors. |
| D | $SnF_2$ | 25.0 | 9.6 | Do. |
| E | $SnCl_2 \cdot 2H_2O$ | 1.25 | 0.32 | No colors, no $TiO_2$ coating. |
| F | $SnCl_2 \cdot 2H_2O$ | 2.50 | 0.68 | Dull colors. |
| G | $SnCl_2 \cdot 2H_2O$ | 5.00 | 1.36 | Excellent colors. |
| H | $SnCl_2 \cdot 2H_2O$ | 12.50 | 3.36 | Do. |
| I | $SnCl_2 \cdot 2H_2O$ | 25.00 | 6.68 | Do. |
| J | $SnCl_2 \cdot 2H_2O$ | 125.0 | 33.40 | Do. |
| K | $SnCl_2 \cdot 2H_2O$ | 250.0 | 66.8 | Fenerally dull colors. |
| L | $SnCl_4 \cdot 5H_2O$ | 25.0 | 4.3 | Good colors. |

Those treatments which have used tin salts equivalent to at least about 1.0% $SnO_2$, and not more than about 35% $SnO_2$ based on the glass flakes used have given excellent results. Of course larger amounts of the salt can be used; however, as indicated, the resulting colors are not as satisfactory.

Example 6

250 parts of glass flakes as in Example 1 are slurried in 2500 parts water to which is added 25 parts of crystalline $SnCl_2 \cdot 2H_2O$. The slurry is heated to the boil and boiled 2 hours, then filtered, washed and dried. 25 part portions of these dry flakes are each slurried in 250 parts water to which is then added varying amounts of titanyl sulfate solution (15.5% $TiO_2$; F.A. −80) as set forth in the table below. Each portion is then boiled 2 hours, filtered, washed free of soluble salts, and dried to give coated glass flakes exhibiting lustrous sparkle and brilliant interference colors which vary with the usage of $TiO_2$ as shown in the table.

| Sample | Titanyl Sulfate Solution | Equivalent $TiO_2$ | Color |
|---|---|---|---|
| A | 6.4 parts | 1.0 parts | Silver. |
| B | 12.9 parts | 2.0 parts | Gold. |
| C | 19.3 parts | 3.0 parts | Violet. |
| D | 25.8 parts | 4.0 parts | Blue. |
| E | 32.2 parts | 5.0 parts | Green. |

Example 7

100 parts of a filter cake of precipitated hydrous $TiO_2$ (36.7% $TiO_2$) is further washed with dilute $NH_2OH$ until free of sulfate ion. It is then dispersed in 1000 parts of water and peptized by adding a small amount of HCl. After standing overnight, the colloidal suspension is decanted from any undispersed particles and adjusted, on a solids content basis, to 1% solids.

100 parts of the glass flakes as used in Example 1 are dispersed in 1000 parts of the 1% hydrous $TiO_2$ colloid and stirred for 30 minutes at room temperature. The slurry is then filtered, washed and dried at 80° C. The dried product is reslurried in 1000 parts water at 60° C. to which is added 615 parts of titanyl sulfate solution (15.5% $TiO_2$; F.A. −80). The slurry is heated to the boil and boiled for 3 hours with samples examined every 15 minutes as shown in Example 1, to obtain the same progression of interference colors as the coating with hydrous $TiO_2$ proceeds. The end point of the series is a lustrous glass flake pigment with a yellowish-green color.

Example 8

5 parts of the fibrous boehmite modification of alumina monohydrate [AlO(OH)] is slurried in 100 parts of water and the pH adjusted to 3.6–3.7 with dilute nitric acid, the mixture then being stirred vigorously, as in a "Waring Blendor," for 15 minutes, and finally diluted to a volume equivalent to 500 parts of water. After standing overnight, the colloidal suspension is decanted from a very small amount of undispersed material and 50 parts of glass flakes is added thereto. After stirring for 30 minutes, the charge is filtered, washed and dried overnight at 80° C. The flakes are redispersed in 500 parts of water at 55° C. to which is added 123 parts of titanyl sulfate solution (15.5% $TiO_2$; F.A. −80) and the charge heated to the boil and boiled 3 hours. Samples taken at 15 minutes intervals show the same progression of interference colors illustrated in Example 1 and the products are lustrous glass flake pigments with brilliant colors.

Example 9

A neutral precipitate of hydrous $ZrO_2$ is peptized with about 10% acetic acid to give a colloidal suspension which is further diluted to 1% $ZrO_2$ content. 25 parts of glass flakes are stirred into 250 parts of the 1% $ZrO_2$ colloid and further stirred for 30 minutes, then filtered, washed and dried at 80° C. to form a nucleating surface of a zirconium oxide compound on the glass flakes. These treated glass flakes are then dispersed in 250 parts of water to which is then added 65 parts of titanyl sulfate solution (15.5% $TiO_2$). The slurry is heated to the boil and held at the boil for 2 hours. The product is filtered, washed free of soluble salts and dried to give a flake pigment with a lustrous sparkle and a bluish-green interference color.

Example 10

50 parts of glass flakes are dispersed in 250 parts of water to which is added 1.25 parts of titanyl sulfate solution (15.5% $TiO_2$ equivalent to 0.2 parts $TiO_2$). The charge is heated with stirring to 90° C. and held at that temperature for 10 minutes thereby forming a nucleating surface on the glass flakes. Then 65 parts of a titanyl sulfate solution (15.5% $TiO_2$ equivalent to 10 parts $TiO_2$) is added rapidly to the treated glass flakes and heating continued for 2 hours. The product is filtered hot, washed free of soluble salts and dried to give a flake pigment with a blue interference color and a lustrous metallic sparkle.

Example 11

100 parts glass flakes are dispersed in 1000 parts of water to which is added 10 parts of stannous chloride ($SnCl_2 \cdot 2H_2O$). The charge is heated to the boil and boiled 2 hours, filtered, washed free of soluble salts and dried at 80° C. thereby forming a nucleating surface on the glass flakes. The treated flakes are then reslurried in 1000 parts of water to which is added 10 parts of stannous chloride and the slurry boiled for 2 hours. Upon filtering, washing and drying, the product is a nacreous flake pigment with brilliant silver appearance and a lustrous sparkle.

Example 12

100 parts glass flakes are dispersed in 1000 parts of water to which is added 10 parts of stannous fluoride ($SnF_2$). The charge is heated to the boil and boiled 2 hours, filtered, washed and dried at 80° C. thereby forming a nucleating surface on the glass flakes. The treated glass flakes are then reslurried in a solution of 10 parts anhydrous ferric chloride ($FeCl_3$) in 1000 parts of water. 10 parts of sodium acetate ($NaC_2H_3O_2$) is then added and the charge heated to the boil and boiled 1 hour. The product is isolated by filtering, washing and drying to give a nacreous flakes pigment which is slightly yellow in color with a lustrous sparkle and a blue interference color.

An equivalent amount of nickel sulfate may be used instead of ferric chloride in this process to given a greenish flake pigment of similar luster.

Example 13

100 parts of glass flakes are treated with a nucleating layer of a tin oxide compound as in Example 12. The flakes are then reslurried in 500 parts of water in which is dissolved 25 parts of chromic sulfate ($Cr_2(SO_4)_3 \cdot 5H_2O$). Powdered borax, ($Na_2B_4O_7 \cdot 10H_2O$) is then slowly added to the agitated slurry at room temperature so that the pH of the slurry is maintained in the range of 5.0 to 5.5. The addition of borax is continued until chromic ions no longer remain in solution after which the product is filtered, washed and dried to give a light green nacreous flake pigment with a blue interference color. Calcination of these coated flakes in air at 700° C. for ½ hour gives a green product of somewhat less intensity with a silver-blue interference color. The particles of chromic oxide on the glass flakes are less than 0.1 micron in diameter.

The use of an equivalent amount of cobalt sulfate ($CoSO_4 \cdot 6H_2O$) in place of the chromic sulfate in this process gives a pinkish flake pigment with a similar luster.

In common with the well known properties of hydrous titanium oxides, the lustrous coated glass flakes of this invention have some limitations on their use, especially in oleo-resinous and other paint vehicles, because of a tendency to change on exposure to light, generally becoming more opaque. The following procedures illustrate methods of stabilizing the products to the influence of light.

Example 14

300 parts of blue coated flakes made after the procedure of Example 6D are slurried in 1000 parts of water at 15–20° C. and the pH is adjusted to 10.0 by the addition of 20 parts of water-white sodium silicate solution (28.4% $SiO_2$; Ratio $SiO_2/Na_2O$–3.28/1). In a separate container, 156 parts of the same sodium silicate solution is diluted with water to 500 parts by volume, and 24.75 parts of 97% $H_2SO_4$ is added to 487 parts of water to give 500 parts by volume. These two solutions are then added simultaneously at an equal rate of about 3 parts by volume per minute (2¾ hours) to the agitated slurry of flakes. During this period, the pH is maintained between 9.5 and 10.0 by the addition of a dilute solution of NaOH, if needed. When all of the solutions have been added, the charge is heated to the boil and boiled ½ hour. It is allowed to stand for settling and washed at least once by decantation, then filtered, washed free of soluble salts and dried. The resulting product shows a slight shift in color toward a greener blue indicating some increase in the thickness of the coating. When dispersed in a solution of cellulose acetate in acetone which is then cast in a thin film and exposed to light in a "Fade-Ometer," there is a pronounced improvement over a similar film prepared from the untreated blue coated glass flakes.

Example 15

100 parts of a gold flake pigment prepared as in Example 6B, and then classified by screening so that the portion used is that portion which goes through a 100 mesh screen, but is retained on a 200 mesh screen (major dimension about 75–150 microns) is calcined in air in a suitable furnace at 700° C. for 1 hour. The resulting product shows very little change in color from the original pigment and is markedly improved in lightfastness. Calcination at 800° C. also improves lightfastness, but causes a marked loss in luster, presumably due to softening of the glass. Calcination at 600° C. has some beneficial effect, but higher temperatures up to about 700° C. are preferred.

Example 16

100 parts of a gold flake pigment (Example 6B) classified in the 100–200 mesh size is slurried in 800 parts of water and the slurry is heated to 60° C. A solution of 4.0 parts of chromic sulfate ($Cr_2(SO_4)_3 \cdot 6H_2O$) in 80 parts of water is then added and the mixture stirred for ½ hour. Thereafter, a solution of 34 parts borax ($Na_2B_4O_7 \cdot 10H_2O$) in 500 parts of water at 60° C. is added and the mixture stirred for an additional ½ hour. It is filtered, washed free of soluble salts and dried to give a lustrous flake pigment which is a slightly greenish-gold in appearance and markedly improved in lightfastness.

A portion of this pigment is then calcined at 600° C. for 1 hour to give lustrous deep gold flakes of excellent lightfastness.

The following examples illustrate the use of the new nacreous flake pigments in a vinyl chloride polymer and an acrylic ester polymer.

*Example 17*

The following ingredients are mixed in a conventional manner:

| | Parts |
|---|---|
| Blue pigment of Example 10 | 3 |
| Vinyl chloride polymer | 100 |
| Dioctyl phthalate | 40 |
| Polyester resin | 10 |
| Stabilizer (barium-cadmium-zinc phosphate) | 3 |
| Stearic acid | 0.25 |

The pigment is added to the mixture of ingredients and the whole mixture is processed on a two-roll mill, heated to 155° C., until uniform. It is finally taken from the mill as a sheet of any desired thickness which may be observed, as obtained, to be a nacreous sheet with a pronounced bluish cast. If press polished as a laminate over a sheet of the same vinyl plastic pigmented with carbon black, the resulting sheet has a lustrous blue metallic appearance which shows no degradation on prolonged exposure to light.

*Example 18*

A baked acrylic lacquer comprises the following ingredients:

| | Parts |
|---|---|
| Blue pigment of Example 10 | 2.5 |
| Mixed acrylic ester polymer ("Acryloid" A–101, Rohm and Haas) | 17.9 |
| Butyl benzyl phthalate | 7.7 |
| Mono-acetate of ethylene glycol monoethyl ether | 20.0 |
| Methyl ethyl ketone | 56.9 |
| Toluene | 50.0 |

The pigment is dispersed by vigorous stirring with the resin and plasticizer together with a portion of the solvents for about 15 minutes; the remainder of the solvents is then added and the mixing continued until uniform. The resulting lacquer is sprayed onto primed panels, dried and baked at 80–85° C. for 20 minutes to give a lustrous blue finish with a metallic appearance which shows no degradation on long exposure to light.

Since it is obvious that many changes and modifications can be made in the above described invention without departing from the nature and the spirit of the invention, it is to be understood that the invention is not limited to said details except as set forth in the appended claims.

We claim:

1. A pigment composition consisting essentially of glass flakes having a specific surface of less than 1 m.²/g., a thickness of 1.0 to 5.0 microns, and the major dimension of the particles of said flakes ranging from about 10–400 microns, with at least 50% being below 75 microns and about 85% being below 150 microns, said flakes having a nucleating surface consisting of 0.2–50%, based on the weight of said flakes, of deposited finely divided colloidal, below 50 millimicron, particles of an acid insoluble metal oxide compound selected from the group consisting of tin oxide and fibrous boehmite alumina deposited directly on said glass flakes, upon which surface is superimposed a thin, adherent coating of an outer translucent layer of metal oxide particles selected from the group consisting of titanium dioxide, zirconium dioxide, chromium oxide, iron oxide, nickel oxide, cobalt oxide, tin oxide and hydrous forms thereof, said layer ranging in thickness from about 20 millimicrons to about 250 millimicrons with the particles thereof being less than 0.1 micron size and composition being a colored, nacreous flake pigment exhibiting, under bright illumination, a lustrous sparkle with a predominant color varying with increasing thickness of the outer translucent layer.

2. The composition according to claim 1 in which at least about 0.2% acid insoluble metal oxide is deposited on the glass flakes as the nucleating layer.

3. A pigment composition consisting essentially of glass flakes having a specific surface of less than 1 m.²/g., a thickness of 1.0 to 5.0 microns, and the major dimension of the particles of said flakes ranging from about 10–400 microns, with at least 50% being below 75 microns and about 85% being below 150 microns, said flakes having a nucleating surface consisting of a deposit of from 0.5–2%, based on the weight of said flakes, of colloidal, below 50 millimicron, particles of an acid insoluble tin oxide compound selected from the group consisting of tin oxide and fibrous boehmite alumina deposited directly on said glass flakes, upon which surfaces is superimposed a thin, adherent coating of an outer translucent layer of metal oxide particles selected from the group consisting of titanium dioxide, zirconium dioxide, chromium oxide, iron oxide, nickel oxide, cobalt oxide, tin oxide and hydrous forms thereof, said layer ranging in thickness from about 20 millimicrons to about 250 millimicrons with the particles thereof being less than 0.1 micron size and composition being a colored nacreous flake pigment exhibiting, under bright illumination, a lustrous sparkle with a predominant color varying with increasing thickness of the outer translucent layer.

4. A pigment composition consisting essentially of glass flakes having a specific surface of less than 1 m.²/g., a thickness of 1.0 to 5.0 microns, and the major dimension of the particles of said flakes ranging from about 10–400 microns, with at least 50% being below 75 microns and about 85% being below 150 microns, said flakes having a nucleating surface consisting of a deposit of from 1–5%, based on the weight of said flakes, finely divided colloidal, below 50 millimicron, particles of an acid insoluble fibrous boehmite alumina deposited directly on said glass flakes and upon which surface is superimposed a thin, adherent coating of an outer translucent layer of metal oxide particles selected from the group consisting of titanium dioxide, zirconium dioxide, chromium oxide, iron oxide, nickel oxide, cobalt oxide, tin oxide and hydrous forms thereof, said layer ranging in thickness from about 20 millimicrons to about 250 millimicrons with the particles thereof being less than 0.1 micron size and composition being a colored nacreous flake pigment exhibiting, under bright illumination, a lustrous sparkle with a predominant color varying with increasing thickness of the outer translucent layer.

5. A pigment composition consisting essentially of glass flakes having a specific surface of less than 1 m.²/g., a thickness of 1.0 to 5.0 microns, and the major dimension of the particles of said flakes ranging from about 10–400 microns, with at least 50% being below 75 microns and about 85% being below 150 microns, said flakes having a nucleating surface consisting of a deposit of from 0.5–2%, based on the weight of said flakes, of colloidal, below 50 millimicron, particles of an acid insoluble tin oxide compound deposited directly on said glass flakes and upon which surface is superimposed a thin, adherent coating of an outer translucent layer consisting essentially of titanium dioxide particles, said layer ranging in thickness from about 20 millimicrons to about 250 millimicrons and containing from 4–40% $TiO_2$ based on the weight of said glass flakes and said $TiO_2$ having a particle size of less than 0.1 micron, said composition being a colored nacreous flake pigment exhibiting, under bright illumination, a lustrous sparkle with a predominant color varying with increasing thickness of the outer translucent layer.

6. A pigment composition consisting essentially of glass flakes having a specific surface of less than 1 m.$^2$/g., a thickness of 1.0 to 5.0 microns, and the major dimension of the particles of said flakes ranging from about 10–400 microns, with at least 50% being below 75 microns and about 85% being below 150 microns, said flakes having a nucleating surface consisting of a deposit of from 1–5%, based on the weight of said flakes, finely divided colloidal, below 50 millimicron, particles of an acid insoluble fibrous boehmite alumina deposited directly on said glass flakes and upon which surface is superimposed a thin, adherent coating of an outer translucent layer consisting essentially of titanium dioxide particles, said layer ranging in thickness from about 20 millimicrons to about 250 millimicrons and containing from 4–40% TiO$_2$ based on the weight of said glass flakes and said TiO$_2$ having a particle size of less than 0.1 micron, said composition being a colored nacreous flake pigment exhibiting under bright illumination, a lustrous sparkle with a predominant color varying with increasing thickness of the outer translucent layer.

7. A process for preparing lustrous flake pigments of a predetermined color which comprises slurrying glass flakes having a specific surface of less than 1 m.$^2$/g., a thickness of 1.0 to 5.0 microns and the major dimension of the flake particles being in the range from about 10–400 microns with at least 50% of said particles being below 75 microns and 85% thereof below 150 microns in an aqueous medium with a positively charged colloidal suspension of a metal oxide compound selected from the group consisting of tin oxide and fibrous boehmite alumina in order to deposit from 0.2–50% based on the said weight of said flakes, of finely divided colloidal, below 50 millimicron, particles of said metal oxide compound directly on the glass flakes as a nucleating surface, insolubilizing said metal oxide deposit on the glass flakes and contacting the treated glass flakes with a solution of a metal salt selected from the group consisting of salts of titanium, zirconium, chromium, iron, nickel, tin and cobalt, hydrolyzing said salt and thereby depositing an outer translucent oxide layer of said metal salt on the treated glass flakes, which layer ranges in thickness from about 20 millimicrons to about 250 millimicrons with the particles of said oxide being less than 0.1 micron in size.

8. The process according to claim 7 wherein the deposit on the glass flakes is insolubilized by heating.

9. A process for preparing lustrous flake pigments of a predetermined color which comprises adding a tin salt to an aqueous slurry of glass flakes having a specific surface of less than 1 m.$^2$/g., a thickness of 1.0 to 5.0 microns and the major dimension of the flake particles being in the range from about 10–400 microns with at least 50% of said particles being below 75 microns and 85% thereof below 150 microns to form a positively charged colloidal suspension of a tin oxide compound that deposits from 0.5–2%, based on the weight of the flakes, of finely divided colloidal below 50 millimicron, particles of said oxide directly on the glass flakes as a nucleating surface, insolubilizing said metal oxide deposit on the glass flakes and then contacting said treated glass flakes with a solution of a titanium salt and hydrolyzing said titanium salt in order to deposit on said treated glass flakes an outer translucent layer of titanium dioxide having a particle size less than 0.1 micron, said layer containing from 4–40%, based on thickness of from 20–250 millimicrons.

10. A process for preparing lustrous flake pigments of a predetermined color which comprises adding fibrous boehmite alumina to an aqueous slurry of glass flakes having a specific surface of less than 1 m.$^2$/g., a thickness of 1.0 to 5.0 microns and the major dimension of the flake particles being in the range from about 10–400 microns with at least 50% of said particles being below 75 microns and 85% thereof below 150 microns to form a colloidal suspension of an alumina boehmite compound that deposits from 1–5%, based on the weight of the flakes, of finely divided colloidal, below 50 millimicron, particles of said alumina directly on the glass flakes as a nucleating surface, insolubilizing said metal oxide deposit on the glass flakes and then contacting said treated glass flakes with a solution of a titanium salt and hydrolyzing said titanium salt in order to deposit on said treated glass flakes an outer translucent layer of titanium dioxide having a particle size less than 0.1 micron, said layer containing from 4–40%, based on the weight of the glass flakes of said TiO$_2$ and having a thickness of from 20–250 millimicrons.

11. A process for preparing lustrous flake pigments of a predetermined color which comprises slurrying glass flakes having a specific surface of less than 1 m.$^2$/g., a thickness of 1.0 to 5.0 microns and the major dimension of the flake particles being in the range from about 10–400 microns with at least 50% of said particles being below 75 microns and 85% thereof below 150 microns in an aqueous medium with a positively charged colloidal suspension of a metal oxide compound selected from the group consisting of tin oxide and fibrous boehmite alumina containing a sufficient amount of said metal oxide to deposit at least about 0.2% of finely divided, colloidal, below 50 millimicron, particles of said oxide of said compound directly on the glass flakes as a nucleating surface, insolubilizing said metal oxide deposit on the glass flakes and then contacting the treated glass flakes with a solution of a metal salt selected from the group consisting of salts of titanium, zirconium, chromium, iron, nickel, tin and cobalt, hydrolyzing said salt and thereby depositing an outer translucent oxide layer having a thickness of from 20–250 millimicrons of said metal salt on the treated glass flakes.

12. The process according to claim 9 with the additional step of adding the flake pigments to a water-soluble silicate solution, hydrolyzing the solution thereby depositing a layer of silica on the glass flakes in order to improve lightfastness.

13. The process according to claim 10 with the additional step of calcining the flake pigments between about 600° to 800° C. for about one hour in order to improve lightfastness.

References Cited

UNITED STATES PATENTS

| | | | |
|---|---|---|---|
| 2,863,783 | 12/1958 | Greenstein | 106—291 |
| 3,087,828 | 4/1963 | Linton | 106—291 |

TOBIAS E. LEVOW, *Primary Examiner.*

J. POER, *Assistant Examiner.*